Dec. 26, 1961 J. L. ANDERSON 3,014,661

SUPERCONDUCTOR CIRCUITS

Filed Oct. 31, 1958 2 Sheets-Sheet 1

INVENTOR
JOHN L. ANDERSON
BY John E. Dougherty Jr.
ATTORNEY

Dec. 26, 1961 J. L. ANDERSON 3,014,661

SUPERCONDUCTOR CIRCUITS

Filed Oct. 31, 1958

2 Sheets-Sheet 2

United States Patent Office 3,014,661

Patented Dec. 26, 1961

3,014,661

SUPERCONDUCTOR CIRCUITS

John L. Anderson, Poughkeepsie, N.Y., assignor to International Business Machines Corporation, New York, N.Y., a corporation of New York Filed Oct. 31, 1958, Ser. No. 771,085
27 Claims. (Cl. 235—175)

The present invention relates to superconductor circuits and, more particularly, to superconductor circuits of the type wherein current from a source is selectively directed to any one of a number of output paths for the circuit by controlling a plurality of superconductor gating devices between superconductive and resistive states.

In the superconductor circuits, using cryotron type devices, which have been heretofore developed, the basic circuit configuration has been usually that of a parallel circuit including two or more superconductive branches with the inputs being applied to superconductor gating devices connected in the various branches so that, for each combination of inputs, resistance is introduced into all but a selected one of the paths and the entire current from a source is then directed through this selected path. A number of examples of circuits of this type are shown and described in U.S. Patent No. 2,832,897, issued April 29, 1958 to D. A. Buck. With this type of circuit configuration, it is, of course, obvious that, if the entire current from the source is to be fed to any one of the paths, all of the other paths must be driven resistive. Further, where the inputs to the paths are arranged so that each path is superconductive only for a combination of inputs satisfying a particular logical function, it is necessary, if the entire current from the source is to be directed to only one path, that the various logical functions represented by the parallel connected circuit paths be mutually exclusive. In order to achieve this result with parallel connected steering circuits of the above described type, it has been necessary to provide sufficient inputs controlling each path to allow for selecting of any one path by introducing resistance into all of the remaining paths. A necessary incident of this type of circuit design when applied to logical circuits, for example of the binary type, is that, for each logical input, two separate control inputs are required, one of which is energized to indicate the presence of the binary input and the other of which is energized to indicate the absence of that particular binary input. More specifically, in binary full adder circuits it has been necessary to provide a pair of separate input control conductors for each of the three binary inputs to the circuit, with a pulse applied to one of each pair representing a binary one input and to the other a binary zero input.

In accordance with the principles of the subject invention, applicant provides current steering and multi function logical circuits wherein the various superconductor gating devices, which are controlled between superconductive and resistive states by the inputs for the circuit, are arranged in a series circuit to which a supply current source is connected. The output conductors for the circuit are connected to junctions in the series circuit to which the gating devices are connected. When it is desired to steer the current from the source out of the series circuit at one of these junctions to one of these output conductors, it is only necessary that the inputs applied drive a particular one of the gating devices resistive. Further, even though more that one of the gating devices is driven resistive, the source current is steered to only one of the output conductors by the particular one of these resistive gating devices which is connected nearest the current source in the series circuit. It thus becomes apparent that, with this type of circuit arrangement, the gating devices may be driven resistive in accordance with different logical combinations of inputs which need not be mutually exclusive, and the logical function represented by each gating device is superseded by the logical function represented by any one of the other gating devices which is connected in the series circuit between it and the current source.

Following these principles, a binary full adder circuit, herein disclosed as an illustrative embodiment of the invention, is constructed by connecting three superconductor gating devices in series in a circuit connected to a current source. Inputs are applied in the form of pulses which energize conductors arranged in magnetic field applying relationship to the gating devices in the series circuit so that a first one of the gating devices is driven resistive when all three inputs are applied; a second one of the gating devices is driven resistive when two or more inputs are applied; and a third one of the gating devices is driven resistive when one or more inputs are applied. The said first gating device is connected nearest the current source and then the second and third gating devices thereafter in succession. Shunting current paths to the first order output terminals for the adder are provided from the junctions in the circuit to which these gating devices are connected so that, when inputs are applied, the current from the source is steered to the proper output terminal by the one of the three gating devices nearest the current source which is resistive. Two of the output shunting paths are provided with control conductors which cause current from a source to be directed to a carry output terminal for combinations of inputs requiring a carry output.

In accordance with another embodiment of the invention, herein disclosed by way of illustrating the manner in which the principles of the invention may be applied in constructing current steering and multifunction logical circuits, a decimal adder circuit is provided which includes a series circuit having a plurality of superconductor gating devices, one for each of the possible sum outputs which may be required. The gating device for the highest possible sum output is connected nearest the current source for the series circuit and, thereafter, the other gating devices representing the lesser possible outputs in descending succession. Output shunting paths are connected to junctions in the series circuit to direct the current from the source to the proper sum output terminals when inputs are applied to the gating devices in the series circuit. As in the binary adder, certain of these output shunting paths are provided with control conductors which control the production of the carry output.

Therefore, it is a principal object of the present invention to provide improved superconductor current steering circuits.

A further object is to provide a superconductor circuit for selectively steering current from a source to one of a plurality of output paths exclusively in response to control inputs applied to the circuit, wherein the control inputs are applied to a plurality of superconductor gating devices connected in a series circuit with the current source and the output paths are connected to junctions in the series circuit to which the gating devices are connected.

It is a further object to provide improved and novel superconductor logical circuits, and more specifically, circuits for providing outputs in accordance with a number of different logical functions which need not be mutually exclusive.

Another object of the invention is to provide a current steering circuit including a plurality of superconductor gating devices connected in series with a current source and a plurality of output current paths extending from junctions to which the gating devices are connected in the series circuit so that, when inputs are applied to drive one or more of the gating devices in the series circuit into a resistive state, the entire current from the source is directed to only one of the output paths by the one of the then resistive gating devices which is connected in the series circuit nearest the current source.

A further object of the invention is to provide improved superconductor logical and adder circuits and, specifically, circuits of this type wherein it is not necessary to apply input pulses representative of zero inputs, a zero input, or differently stated, the absence of a particular input, being represented by the absence of a pulse on a particular input and, further, to provide such circuits without the necessity of utilizing superimposed control windings on superconductor gating devices.

Still another object of the invention is to provide circuits of the above described type wherein at least some of the gating devices in the series circuit include a plurality of parallel superconductor strips to which the inputs are applied in the form of magnetic fields so that each gating device is driven resistive for a combination of inputs satisfying a particular logical function and, possibly, for combinations of inputs satisfying other logical functions, with each gating device taking precedence in controlling the production of outputs over the other gating devices which it precedes in the series circuit.

Therefore, it is another object of the invention to provide a logical circuit for provding outputs in accordance with a number of different logical functions wherein certain of the logical functions take precedence over other logical functions in producing outputs for the circuit.

These and other objects of the invention will be pointed out in the following description and claims and illustrated in the accompanying drawings, which disclose, by way of examples, the principles of the invention and the best mode, which has been contemplated, of applying that principle.

Figure 1:
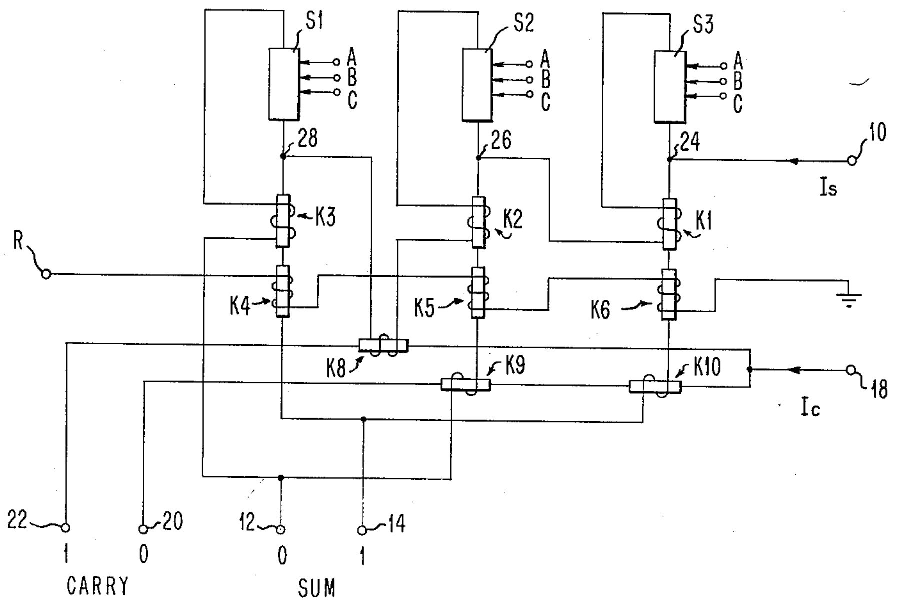
FIG. 1 is a schematic representation of a binary full adder circuit.

Referring now to the binary full adder circuit of FIG. 1, this circuit in accordance with the principles of the invention includes three superconductor gating devices S1, S2, S3, that are termed special cryotrons, and a number of superconductor gating devices in the form of wire wound cryotrons K1 through K6 and K8 through K10. Source current for the circuit is supplied in the form of a sum current $I_s$ and a carry current $I_c$. Current $I_s$ is applied to a terminal 10 and directed in accordance with the binary inputs applied to the circuit to either a zero first order output terminal 12 or a one first order output terminal 14. The carry current $I_c$ is similarly applied at a terminal 18 and is directed in accordance with the binary inputs applied to the circuit to either a zero second order output terminal 20 or a one second order output terminal 22. The first and second order output terminals are hereafter referred to as sum and carry terminals, respectively. The three binary inputs for the circuit are designated "A," "B," and "C" and are applied to the special cryotrons S1, S2, and S3 in a manner which will be explained in detail when the structure of these cryotrons is described with reference to FIG. 2. For the present, it suffices to state that the special cryotrons S1, S2, and S3 are, in the absence of any binary inputs, in a superconductive state.

Upon examination of the circuit, it can be seen that special cryotrons S1, S2, and S3 actually form a series circuit extending between terminals 24 and 12 and, at each of three of the terminals or junctions 24, 26 and 28 in this circuit, there extends a shunt circuit through the gates of one of the cryotrons K1, K2, or K3 to one of the sum output terminals 12 or 14. Prior to the application of the "A," "B," "C" binary inputs, a reset pulse is applied at a terminal R, thereby causing sufficient current to flow in the control coils of cryotrons K4, K5, and K6 to drive the gates of these cryotrons resistive. With cryotron K6 resistive, the entire current $I_s$ is directed from a terminal 24 through the then superconductive special cryotron S3 and the coil of cryotron K1 to terminal 26. Since cryotron K5 is also resistive, the current $I_s$ is directed from this terminal through the special cryotron S2 and the coils of cryotrons K2 and K8 to a terminal 28. Similarly, with the cryotron K3 resistive, the current $I_s$ is directed from terminal 28 through special cryotron S1 and the control coil of cryotron K3 to the zero sum output terminal 12. It should be here noted that all of the output terminals are connected either directly or through further superconductive circuitry to ground.

As the result of the application of the reset pulse to terminal R, as described above, the current $I_s$ is directed through the control coils of cryotrons K1, K2, K3, and K8. This current in these control coils drives the gates of these cryotrons resistive so that, upon termination of the reset pulse, the cryotrons K1, K2, and K3, being in a resistive state, hold the circuit stable with the current $I_s$ flowing through the series circuit, which includes the special cryotrons S1, S2, and S3, to the zero sum output terminal 12. The gate of cryotron K8 is connected in the circuit to which the carry current $I_c$ is supplied and, with this cryotron in the resistive state, carry current $I_c$ is directed through the then superconductive gates of cryotrons K9 and K10 to the zero carry output terminal 20.

After the reset pulse has been terminated and the current distribution described above has been obtained, that is, the sum current $I_s$ being directed through the series circuit including special cryotrons S3, S2, and S1 to the zero sum output terminal 12 and the carry current $I_c$ being directed to the zero carry terminal 20, the "A," "B," "C" binary inputs are applied. These inputs are applied to control conductors for cryotron gates which form the special cryotrons S1, S2, and S3. An input of one is applied by applying a pulse to the appropriate lead and an input of zero is applied by failing to apply a pulse to the appropriate lead. The design of the special cryotrons is such that the first special cryotron S3 is driven resistive only when each of the three binary inputs is a one; special cryotron S2 is driven resistive only when two or more of the binary inputs have a value of one; and cryotron S1 is driven resistive when any one or more of the binary inputs has a value of one.

Consider first, the case where one of the binary inputs has a value of one and the other two having a value of zero. Special cryotrons S3 and S2 remain superconductive and only cryotron S1 is driven resistive. Current $I_s$, therefore, continues to flow through special cryotrons S3 and S2 to terminal 28. However, since the cryotron S1 is being held resistive by the binary inputs applied, the current $I_s$ begins to shift at terminal 28 out of special cryotron S1 to the gate of cryotron K3, which is connected in parallel therewith. The resistance of cryotron S1 is such that this shifting continues until there is no longer sufficient current in the control coil of cryotron K3 to hold this cryotron resistive. The entire current $I_s$ is then directed from terminal 28 and through the gates of cryotrons K3 and K4 to the one sum output terminal 14. This change in the distribution of the current $I_s$ does not effect the distribution of current $I_c$ which continues to be directed to the zero carry output terminal 20 so that, when only one of the three inputs applied has a value of one, a sum output of one and a carry output of zero is indicated which is, of course, in accordance with the rules of binary addition. It should be noted that during the above current shifting occasioned by special cryotron S1 being driven resistive, special cryotrons S2 and S3 remain superconductive and, therefore, the sum current $I_s$ maintains cryotrons K1 and K2 resistive, thereby ensuring that no current is shifted through the gates of these cryotrons to either of the sum output terminals 12 or 14.

When two of the binary inputs applied have a value of one, and the other has a value of zero, both of the special cryotrons S1 and S2 are driven resistive. The current Is, which, prior to the application of these inputs, is directed through all three of the special cryotrons to the zero sum output terminal 12, now begins to shift both at the terminals 26 and 28 to the parallel circuits including the gates of cryotrons K2 and K3. However, the resistance of cryotron S2 is sufficient to cause enough of the current Is to be shifted to allow cryotron K2 to become superconductive. The entire current Is is then directed from terminal 26 through a circuit including the gate of cryotron K2 and the coil of cryotron K9 to the zero sum output terminal 12. The current Is is therefore shunted out of the series circuit at a point before terminal 28 and the parallel connected cryotrons S1 and K3 so that, even though special cryotron S1 is resistive, no current reaches the one sum output terminal 14.

With the sum current Is being directed through the coil of cryotron K9 as the result of special cryotron S2 being driven resistive, the gate of this cryotron K9 is driven resistive. As a result, the carry current Ic is now directed through the gate of cryotron K8, which is now in a superconductive state since the current Is is no longer flowing from terminal 26 to terminal 28, to the one carry output terminal 22. Thus, it can be seen that, as is required by the rules of binary addition, when two of the binary inputs applied have a value of one and one has a value of zero, the sum and carry current Is and Ic are directed to output terminals 12 and 22 respectively, indicative of a sum output of zero and a carry output of one.

When, after a reset pulse is applied at terminal R, three binary inputs each having a value of one are applied, all three of the special cryotrons S1, S2, and S3 are driven resistive. The operation of the circuit is then similar to that described above with the exception that, under these conditions, the entire current Is is directed from terminal 24 through the gates of cryotrons K1 and K6 and the control coil of cryotron K10 to the one sum output terminal 14, and there is no current Is flowing in the circuit from terminal 24 to terminal 26, nor from terminal 26 to terminal 28. The current Is flows through the coil of cryotron K10, driving the gate of this cryotron resistive. The carry current Ic is then directed through the gate of cryotron K8, now superconductive with no current flow through terminals 26 and 28, to the carry one output terminal 22. Thus, when three inputs of one are applied, the sum and carry currents are respectively directed to the output terminals 14 and 22, indicating a sum output of one and a carry output of one which is in accordance with the rules of binary addition. Particular note should be made of the fact that, considering the cryotron S3 to be a higher order output cryotron than cryotron S2, and similarly the cryotron S2 to be a higher order output cryotron than the cryotron S1, though more than one of these cryotrons is driven resistive for a particular combination of inputs, the higher order cryotron which is driven resistive controls the output which is produced, the lower order cryotron being effectively shunted out of the circuit.

Figure 2:
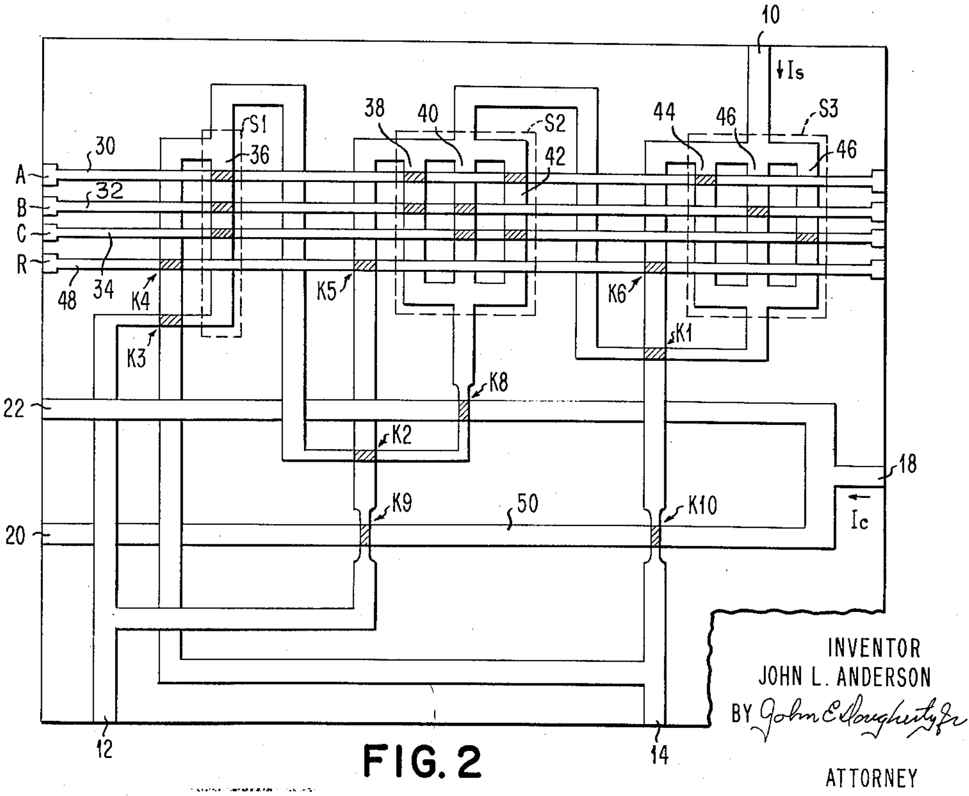
FIG. 2 shows a thin film embodiment of a binary full adder circuit.

FIG. 2 shows a thin film embodiment of the adder circuit of FIG. 1. Thin film type cryotrons as well as methods of fabricating such cryotrons and circuits employing them are described in copending applications, Serial No. 625,512, filed November 30, 1956 and Serial No. 765,760, filed October 7, 1958, both of which are assigned to the assignee of the subject application. The special cryotrons S1, S2, and S3 are shown in the circuit of FIG. 2 within the dotted boxes so designated. The circuit of this figure is formed of a plurality of strips of superconductor material which form both the current paths for the circuit and the gating devices which control the operation of the circuit. In this figure, there are shown strips having both narrow and wide sections and a cryotron is represented at each point whereat a strip having a narrow section traverses a strip having a wide section, such points being indicated in the drawings by cross-hatching. The wide sections of the strips at the points of intersection designated by the cross-hatching are fabricated of a soft superconductor material such as tin and all the remaining sections of the strips are fabricated of a hard superconductor material such as lead. The terms hard and soft are relative, the former indicating superconductor material requiring a magnetic field of relatively high intensity to drive it resistive at the operating temperature of the circuit, and the latter indicating material requiring a magnetic field of relatively low intensity to drive it resistive at the operating temperature of the circuit. At each of the points of intersection at which a cryotron is formed by a narrow strip section traversing a wider strip section, the wider section, as described above, is fabricated of soft superconductor material and serves as a cryotron gate and the narrow section is fabricated of hard superconductor material and serves as a cryotron control conductor. With the exception of the thin film cryotrons which form the special cryotrons S1, S2, and S3, the cryotrons of FIG. 2 formed by the intersecting film strips are designated using the same reference numerals as are used in FIG. 1.

The circuit of FIG. 2 is constructed in the same manner as that of FIG. 1 with the exception that thin film cryotrons instead of the wire conventional cryotrons are employed. Further, in FIG. 2, the manner in which the special cryotrons S1, S2, and S3 are fabricated and the binary "A," "B," and "C" inputs applied are indicated. The "A," "B," "C" binary inputs are applied at terminals, A, B, and C, causing current to flow in control strips respectively designated 30, 32, and 34. As pointed out above, an input pulse is applied to a corresponding one of these terminals only when a binary input of one is to be entered into the full adder and no pulse is applied for a binary input of zero. The special cryotron S1, as shown, consists of a single strip 36 which includes soft superconductor sections traversed by each of the strips in 30, 32, and 34 so that when a binary one input is applied in the form of a pulse at any one or more of the binary inputs, this special cryotron is driven resistive. Special cryotron S2 includes three parallel strips 38, 40, and 42. Strip 38 includes two soft superconductor sections one of which is traversed by strip 30 and the other of which is traversed by strip 32; strip 40 includes two soft superconductor sections, one of which is traversed by strip 32 and the other of which is traversed by strip 34; strip 42 is likewise provided with two soft superconductive sections, one of which is traversed by strip 30 and the other of which is traversed by strip 34. Therefore, when input pulses are applied to only one of the strips 30, 32, and 34, one of the strips 38, 40, and 42 remains superconductive and the cryotron S2 may be then considered to be superconductive. However, when inputs are applied to any two or more of the strips 30, 32, and 34, resistance is introduced into each of the paths 38, 40, and 42 so that the special cryotron S2 is driven resistive. Similarly, cryotron S3 includes three parallel strips 44, 46, and 48, each of which includes one soft superconductor section, which is traversed by a corresponding one of the strips 30, 32, and 34 so that one or more of these strips remain entirely superconductive unless input pulses are applied to all three of the strips 30, 32, and 34. The operation of the circuit of FIG. 2 is the same as that of FIG. 1, the circuit being initially reset by applying a signal at terminal R and, therefore, to a strip 48, to drive cryotrons K4, K5, and K6 resistive and cause the current Is to be directed through each of the special cryotrons S3, S2, and S1 to the zero sum output terminal 12. The carry current Ic is directed through a strip 50 to the zero carry output terminal 20. Thereafter, binary inputs may be applied in the manner described above and, for each combination of inputs outputs are produced at one of the sum output terminals 12 or 14 and one of the carry output terminals 20 or 22 in accordance with the rules of binary addition.

Figure 3A:
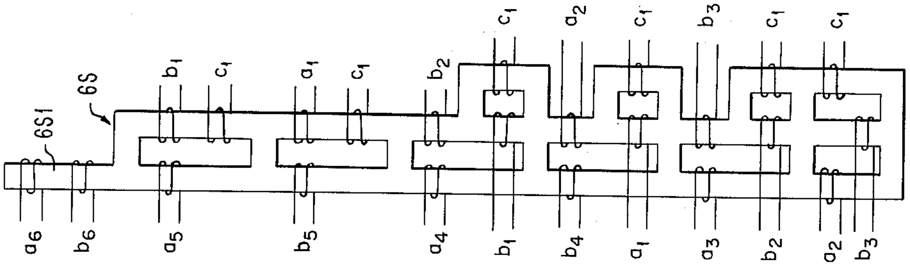
FIG. 3A is a more detailed showing of one of the special cryotrons shown in block diagram form in FIG. 3.
Figure 3:
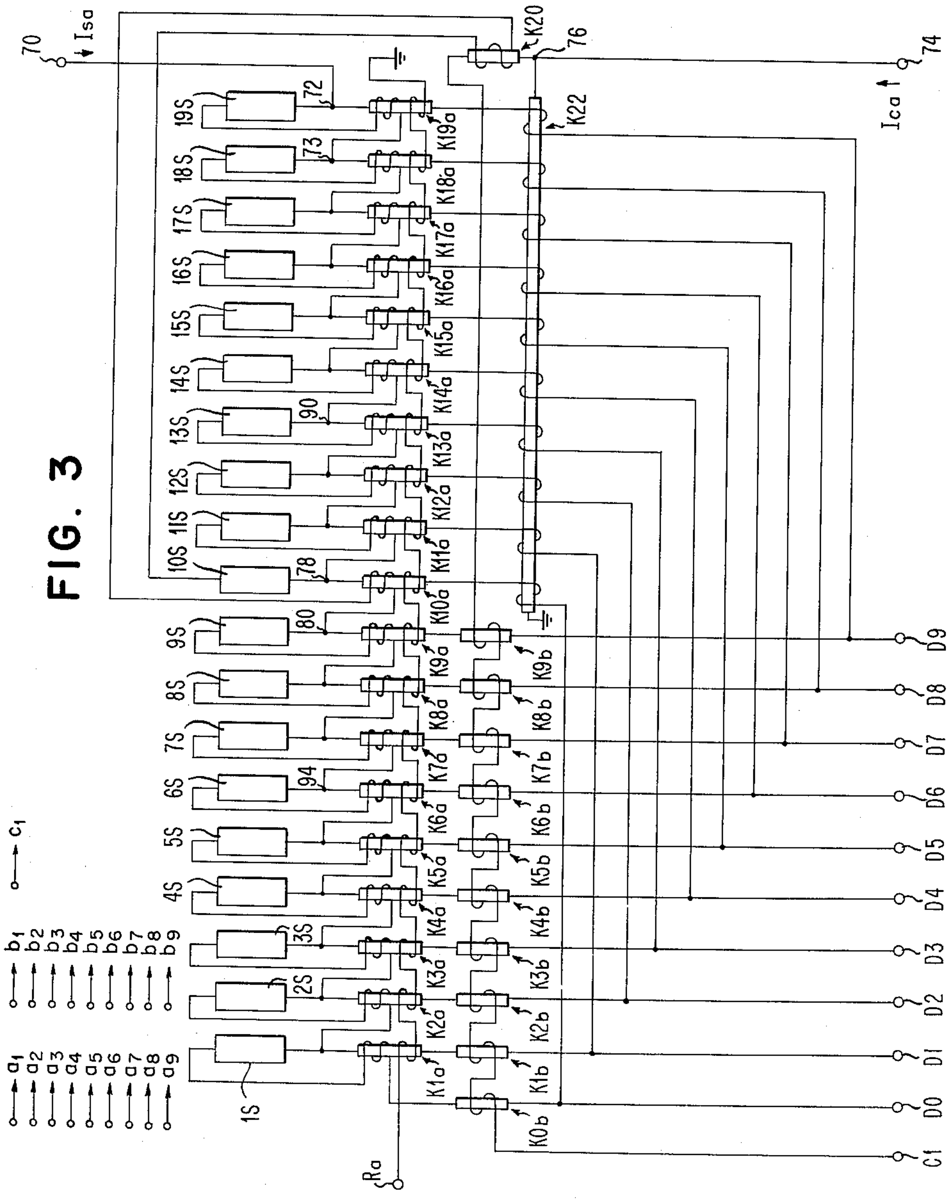
FIG. 3 is a schematic representation of a decimal full adder circuit.

The principles of the invention may also be applied to the control of circuit for performing arithmetic operations on values expressed in any notation as is illustrated by the decimal adder circuit shown in FIG. 3. This circuit includes special cryotrons, designated 1S through 19S. In decimal addition, there are two inputs which may have a value of zero through 9, and a carry input which may have a value of one or zero. Thus, there are 19 possible sums other than zero. In the circuit of FIG. 3, the special cryotron 1S controls the production of outputs when the sum of the three inputs applied is one; the special cryotron 2S operates similarly when the sum of the three inputs is two, etc., and the special cryotron 19S controls the production of the outputs when the sum of three inputs applied is 19. The circuit of FIG. 3 is designed in a manner similar to that of the circuit of FIGS. 1 and 2 so that the inputs applied may cause more than one of the special cryotrons 1S through 19S to be driven resistive and the higher value cryotron which is driven resistive shunts the sum current to the proper output terminal. As in the binary adder circuit of FIGS. 1 and 2, the special cryotrons are connected in a series circuit to which the current *Is* is supplied. At each of the junctions or terminals in the series circuit (e.g. 72, 73, 78, 80) an output circuit is provided which shunts the remainder of this series circuit and provides a current path to a proper one of a plurality of first order decimal output terminals designated D0 through D9. Each of these output circuits includes a cryotron gate which has its control conductor connected in the series circuit. Thus, the gate of cryotron K19*a* is connected in the output circuit extending from terminal 72 to output terminal D9 and the control conductor for this cryotron is connected in the series circuit between special cryotron 19S and the next junction 73 to which special cryotron 18S is connected.

The sum current for the decimal adder circuit of FIG. 3 is applied at terminal 70, which is connected to terminal 72, from which extend in parallel the series circuit including the special cryotrons 19S through 1S to the zero sum output terminal D0, and the output circuit including shunt cryotron K19*a* to the nine sum output terminal D9. The carry current designated I*ca* is applied at a terminal 74 which is connected to terminal 76 from which extend in parallel two current paths, one to ground and the other to the one carry output terminal designated C1.

The circuit is initially conditioned for operation by applying a reset pulse at terminal R*a* to which there is series connecting a plurality of control conductors, each of which embraces the gate of one of the shunt cryotrons K1*a* through K19*a*. When this reset pulse is applied, each of these cryotrons is driven resistive so that the sum current is directed through the series circuit including special cryotrons 19S through 1S, and then through the gate of the cryotron K0*b* to the zero sum output terminal designated D0. This series circuit includes, between the terminals 78 and 80, the control conductor of a cryotron K20. The current I*sa* drives the gate of this cryotron resistive so that the carry current I*ca* is directed through the gate of cryotron K22 to ground.

There are 10 control coils for cryotron K22, each connected in parallel with one of the shunt gates K10*a* through K19*a*. Unless the sum of the inputs applied is ten or more, each of the special cryotrons 10S through 19S remains superconductive so that there is no current through any one of the control coils embracing the gate of cryotron K22. When the sum of the inputs applied is ten or more, one of the special cryotrons 10S through 19S is driven resistive so that sum current I*sa* is directed through the gate of the corresponding one of the shunt cryotrons K10*a* through K19*a* and one of the coils embracing cryotron K22 to the appropriate one of the output terminals D0 through D9. Under these conditions, the sum current is shunted to the proper sum output terminal before it reaches terminal 78, and therefore, cryotron K20 remains superconductive and the carry current I*ca* is directed through the gate of this cryotron and the coil of cryotrons K9*b* to K0*b* to the one carry output terminal C1. When the sum of the inputs is less than ten, cryotron K22 remains superconductive and cryotron K20 is resistive so that the carry current I*ca* is directed to ground and there is no output current at terminal C1.

The operation of the decimal adder circuit of FIG. 3 is similar to that of the binary full adder of FIGS. 1 and 2. The decimal and carry inputs are applied at a plurality of terminals $a_1$ through $a_{10}$, $b_1$ through $b_{10}$, and *c*. These terminals are connected to the control conductors for the gates which form the special cryotrons 1S through 19S in such a way that for each combination of inputs, the proper one of the special cryotrons is driven resistive, as well as one or more lower value cryotrons. For example, FIG. 3A illustrates the construction of the special cryotron 6S. In this figure, coils are used to represent the control conductors and the designations $a_6$, $b_6$, $c_1$, etc. on the coils indicate the input terminals to which they are connected. It can be seen that this cryotron includes a gate strip 6S1 about which control coils connected to the $a_6$ and $b_6$ input terminals are wound, and connected in series with this strip is a number of combinations of parallel strips controlled by other control conductors. Special cryotron 6S is driven resistive for any combination of "*a*," "*b*," and "*c*" inputs demanding a sum output of 6. This cryotron is also driven resistive for combinatons of "*a*," "*b*," and "*c*" inputs requiring certain higher value sum outputs to be produced. For example, for an "*a*" input of 6, a "*b*" input of 6, and a "*c*" input of 1, cryotron 6S is driven resistive along with the proper sum output cryotron 13S. However, the sum current I*sa* is shunted at a terminal 90 through shunt cryotron K13*a* to the proper first order output terminal D3. The sum current, therefore, never reaches the terminal 94, from which extend in parallel, special cryotron 6S and shunt cryotron K6*a* so that the fact that cryotron 6S is resistive has no effect on the circuit operation.

Thus, it can be seen that by this circuit design, which allows each of the special cryotrons to be driven resistive not only for combinations of inputs requiring an output of the sum it represents, but also for combinations of inputs requiring higher sum outputs, the fabrication of the special cryotron is greatly simplified. It should be noted that, when the inputs are such that when a sum of ten or more is required and, therefore, an output should be manifested at one of the low order output terminals D0 through D9 and also at the high order output terminal C1, the carry current I*ca* passes through the control coils on a number of gates K9*b* through K0*b* to hold these cryotrons resistive and, therefore, isolate output terminals C1 and D0 through D9 from that portion of the series circuit which includes special cryotron 1S through 9S. This ensures that the entire sum current I*sa* is fed to the proper one of the output terminals D0 through D9 and the entire carry current is directed to the second order output terminal C1 and neither of these currents is fed back up through one of the cryotrons K1*a* through K9*a* to possibly produce a spurious output signal.

While there have been shown and described and pointed out the fundamental novel features of the invention as applied to a preferred embodiment, it will be understood that various omissions and substitutions and changes in the form and details of the device illustrated and in its operations may be made by those skilled in the art without departing from the spirit of the invention.

It is the intention, therefore, to be limited only as indicated by the scope of the following claims.

What is claimed is:

1. In a super conductor circuit for selectively steering current from a source exclusively to any one of a plurality of output terminals for said circuit; a plurality of superconductor gating devices each maintained at a temperature at which it is superconductive in the absence of a magnetic field and each connected in a series circuit to which said current source is connected; a plurality of control conductors for selectively controlling said gating devices between superconductive and resistive states; said plurality of control conductors including at least first and second series connected control conductors for controlling different ones of said gating devices; said first and second control conductors being series connected so that each time said first control conductor is energized said second control conductor is also energized; each of said output terminals being connected to at least one of a plurality of junctions in said series circuit; each of said junctions being separated from the others of said junctions by at least one of said gating devices; whereby the current from said source is directed to any one of said output terminals exclusively by energizing said control conductors to drive resistive one of said gating devices in said series circuit connected between the junction to which that output terminal is connected and the next junction further removed from said source in said series circuit to which another one of said output terminals is connected.

2. The circuit of claim 1 wherein said circuit includes a further plurality of superconductor gating devices; each of said output terminals being separated from the junction to which it is connected by one of said further plurality of superconductor gating devices each of which is maintained at a temperature at which it is superconductive in the absence of a magnetic field; a further plurality of control conductors one for each of said gating devices in said further plurality for controlling that gating device between superconductive and resistive states; each of said control conductors in said further plurality being connected in said series circuit between the junction to which the gating devices it controls is connected and the next junction further removed from said current source in said series circuit.

3. In a superconductor logical circuit for producing outputs in accordance with a plurality of different logical functions with certain of said functions taking precedence over others of said functions in producing said outputs; a plurality of superconductor gating devices each maintained at a temperature at which it is superconductive in the absence of a magnetic field and each connected in a series circuit; a plurality of output conductors for said circuit each connected to a different one of a plurality of junctions in said series circuit; each of said junctions being separated from each of the other of said junctions in said series circuit by at least one of said gating devices; a plurality of inputs for said superconductor logical circuit arranged in magnetic field applying relationship to said gating devices for driving said gating devices resistive in accordance with said logical functions; whereby the current from said source is directed to a particular one only of said output conductors by the one of said gating devices nearest said current source in said series circuit which is driven resistive by said inputs, and each gating device takes precedence in the production of outputs over those of the other gating devices which it separates from said source in said series circuit.

4. In a superconductor circuit; first, second, third, fourth, fifth, and sixth superconductor gating devices each maintained at a temperature at which it is superconductive in the absence of a magnetic field; first, second, third, fourth, fifth, and sixth control conductor means each arranged in magnetic field applying relationship to a corresponding one of said gating devices for controlling it between superconductive and resistive states; and a current input terminal; said first, second, and third gating devices being connected in series between said current input terminal and a further terminal with said first gating device being connected between said current input terminal and said second gating device and said second gating device being connected between said first and third gating devices; said fourth gating device being connected to a first junction between said gating device and said current source and extending in parallel circuit relationship to said first, second, and third gating devices with respect to said current input terminal; said fifth gating device being connected to a second junction between said first and second gating devices and extending in parallel circuit relationship to said second and third gating devices with respect to said current input terminal; said sixth gating device being connected to a third junction between said second and third gating devices and extending in parallel circuit relationship to said third gating device with respect to said current input terminal; whereby, when said first gating device is resistive and said fourth gating device superconductive, a current pulse applied at said input terminal is shunted from said second, third, fifth, and sixth gating devices and directed through said fourth gating device regardless of the states of said second, third, fifth, and sixth gating devices; when said first and fifth gating devices are superconductive and said second and fourth gating devices are resistive, a current applied at said input terminal is shunted from said third and sixth gating devices and is directed through said fifth gating device regardless of the states of the third and sixth gating devices; and a current applied at said input terminal is directed through said sixth gating device when said first, second and sixth gate conductors are superconductive and said third, fourth and fifth gating devices are resistive.

5. The circuit of claim 4 wherein said fourth, fifth, and sixth control conductor means are connected in series with said first, second, and third gating devices; said fourth control conductor means being connected between said first and said second junctions; said fifth control conductor means being connected between said second and third junctions; and said sixth control conductor means being connected between said third junction and said further terminal.

6. The circuit of claim 4 wherein at least one of said first, second and third superconductor gating devices comprises a plurality of parallel superconductor gates; and each of said first, second, and third control conductor means includes individual control conductors for applying magnetic fields to said gates for controlling the state, superconductive or resistive, thereof.

7. The circuit of claim 4 wherein said control conductor means and gating devices are planar strips of superconductor material.

8. The circuit of claim 4 wherein said circuit is a binary full adder and said fourth and sixth superconductor gating devices are connected to a first order output terminal for said binary adder.

9. The circuit of claim 4 wherein said circuit is a decimal adder and said fourth, fifth and sixth gating devices are each connected to a different first order output terminal for said decimal adder.

10. In a superconductor circuit for selectively directing current from a current source to first and second outputs; first and second superconductor gating devices connected in series with said current source; said first gating device being connected between said source and said second gating device; a third superconductor gating device extending from a terminal between said first gating device and said source to said first output for said superconductor circuit; a fourth superconductor gating device extending from a terminal between said first and second gating devices to said second output for said superconductor circuit; means maintaining each of said gating devices at a temperature at which it is superconductive in the absence of a magnetic field; reset means for initially applying magnetic fields to said third and fourth gating devices to drive these gating devices resistive and cause the current from said source to be directed through said series connected first and second gating devices; input means for thereafter applying magnetic fields to said first and second gating devices to selectively drive these gating devices resistive; whereby, when only said second gating device is driven resistive, the current from said source is directed through said fourth gating device to said second output for said circuit only; and, when said first gating device is driven resistive said current from said source is directed through said third gating device to said first output for said circuit only regardless of whether or not said second gating device is resistive or superconductive.

11. In a superconductor circuit; a series circuit including a first superconductor gating device connected between a first and a second junction and a second superconductor gating device connected between said second junction and a third junction; a current source connected to said first junction; a first circuit for shunting current from said source out of a first portion of said series circuit extending from said first to said third junction; said first shunting circuit including a third superconductor gating device connected to said first junction; a second circuit for shunting current from said source from another portion of said series circuit extending from said second to said third junction; said second shunting circuit including a fourth superconductor gating device connected to said second junction; means maintaining each of said gating devices at a temperature at which it is superconductive in the absence of a magnetic field; and control conductor means arranged in magnetic field applying relationship to said gating devices for controlling the state, superconductive or resistive thereof; said control conductor means including first and second control conductors each arranged to control a corresponding one of said first and second gating devices and connected in series so that each energizing signal applied to said first control conductor is also applied to said second control conductor; whereby, when said first gating device is resistive and said third gating device is superconductive, said current from said source is shunted from said first portion of said series circuit through said first shunting circuit regardless of the state of said second and fourth gating devices.

12. In a superconductor circuit; a series circuit including a first superconductor gating device connected between a first and a second junction and a second superconductor gating device connected between said second junction and a third junction; a current source connected to said first junction; a first circuit for shunting current from said source out of a first portion of said series circuit extending from said first to said third junction; said first shunting circuit including a third superconductor gating device connected to said first junction; a second circuit for shunting current from said source from another portion of said series circuit extending from said second to said third junction; said second shunting circuit including a fourth superconductor gating device connected to said second junction; means maintaining each of said gating devices at a temperature at which it is superconductive in the absence of a magnetic field; and control conductor means arranged in magnetic field applying relationship to said gating devices for controlling the state, superconductive or resistive thereof, including first and second control conductors each connected in said series circuit and each arranged in magnetic field applying relationship to a corresponding one of said third and fourth gating devices; whereby, when current from said source is directed through said series circuit, said third and fourth gating devices are maintained in a resistive state.

13. In a superconductor circuit; a series circuit including a first superconductor gating device connected between a first and a second junction and a second superconductor gating device connected between said second junction and a third junction; a current source connected to said first junction; a first circuit for shunting current from said source out of a first portion of said series circuit extending from said first to said third junction; said first shunting circuit including a third superconductor gating device connected to said first junction; a second circuit for shunting current from said source from another portion of said series circuit extending from said second to said third junction; said second shunting circuit including a fourth superconductor gating device connected to said second junction; means maintaining each of said gating devices at a temperature at which it is superconductive in the absence of a magnetic field; and control conductor means arranged in magnetic field applying relationship to said gating devices for controlling the state, superconductive or resistive, thereof; said control conductor means including first and second control conductors; said first control conductor being connected in said series circuit between said first and second junctions and arranged in magnetic field applying relationship to said third gating device; said second control conductor being connected in said series circuit between said second and third junctions and arranged in magnetic field applying relationship to said fourth gating device; whereby, when current from said source is directed through said first and second gating devices, said third and fourth gating devices are maintained in a resistive state, and, when said first and fourth gating devices are superconductive and said second gating device is resistive, said third gating device is also maintained resistive so that current from said source is directed only through said second shunting circuit including said fourth gating device.

14. In a superconductor circuit; a series circuit including a first superconductor gating device connected between a first and a second junction, a second superconductor gating device connected between said second junction and a third junction, and a third superconductor gating device connected between said third junction and a fourth junction; a current source connected to said first junction; a first superconductor path connected to said first junction for shunting current from a first portion of said series circuit extending from said first junction to said fourth junction; a second superconductor path connected to said second junction for shunting current from a second portion of said series circuit extending from said second to said fourth junction; a third superconductor path connected to said third junction for shunting current from a third portion of said series circuit extending from said third to said fourth junction; means maintaining each of said gating devices at a temperature at which it is superconductive in the absence of a magnetic field; control conductor means arranged in magnetic field applying relationship to said gating devices for controlling said gating devices between resistive and superconductive states; whereby, when said first gating device is driven resistive and said first superconductor path is superconductive, the current from said source is shunted out of said series circuit at said first junction and through said first path regardless of the state, resistive or superconductive, of said second and third gating devices; and, when said second gating device is resistive and said first gating device and second superconductor path are superconductive, the current from said source is shunted out of said series circuit at said second junction and through said second path regardless of the state, resistive or superconductive, of said third gating device.

15. The circuit of claim 14 wherein said first, second, and third superconductor paths include fourth, fifth, and sixth gating devices, respectively; and said series circuit includes first, second, and third control conductors arranged in magnetic field applying relationship to said fourth, fifth, and sixth superconductor gating devices, respectively, for controlling the state thereof; said first control conductor being connected between said first and said second junctions; said second control conductor being connected between said second and third junctions; said third control conductor being connected between said third and fourth junctions.

16. The circuit of claim 14 wherein at least one of said first, second, and third gating devices includes a plurality of superconductor gate conductors connected in parallel circuit relationship between the junctions between which said one gating device is connected in said series circuit.

17. The circuit of claim 16, wherein the circuit is a binary adder circuit having an output terminal to which said first and third superconductor paths are connected and said control conductor means arranged in magnetic field applying relationship to said first, second, and third gating devices includes first, second, and third input conductors to which inputs for said binary adder are applied; said input conductors being effective to drive said first gating device resistive only when inputs are applied to all three of said input conductors; said input conductors being effective to drive said second gating device resistive only when inputs are applied to two or more of said input conductors; said input conductors being effective to drive said third gating device resistive when inputs are applied to any one or more of said input conductors.

18. The circuit of claim 16 wherein said circuit is a decimal adder circuit to which inputs are applied by energizing said control conductor means arranged in magnetic field applying relationship to said first, second, and third gating devices; said control conductor means being so arranged that each of said gating devices is driven resistive for all combinations of inputs requiring a corresponding particular decimal sum output as well as for at least one other combination of inputs requiring a larger decimal sum output; each of said first, second, and third superconductor paths being connected to a different output terminal for said decimal adder circuit.

19. In a superconductor circuit; a first plurality of superconductor gating devices connected in series between a first and a second terminal; a source of current connected to said first terminal; a second plurality of superconductor gating devices; a plurality of output conductors for said circuit connected to said series circuit only through said gating devices in said second plurality; one of said output conductors being connected through a first one of said gating devices in said second plurality to a junction in said series circuit between a first pair of said gating devices in said first plurality; another of said output conductors being connected through a second one of said gating devices in said second plurality to a junction in said series circuit between a second pair of said gating devices in said first plurality; means maintaining said gating devices at a superconductive temperature; and control conductor means arranged in magnetic field applying relationship to said gating devices for controlling the state, superconductive or resistive thereof, and thereby selectively directing said current from said source to said output conductors.

20. In a superconductor logical circuit; a first superconductor gating device including at least two parallel superconductor gate conductors; a second superconductor gating device including at least two parallel superconductor gate conductors; said first and second gating device being connected in a series circuit between a first terminal and a second terminal; a source of current connected to said first terminal; a third superconductor gating device connected between a first output terminal for said logical circuit and said first terminal in said series circuit; a fourth superconductor gating device connected between a second output terminal for said logical circuit and a junction between said first and second gating devices; means maintaining said gating devices at a superconductive temperature; means for driving said third and fourth gating devices resistive to cause said current from said source to be directed through said series circuit to said second terminal thereof; a plurality of individual inputs for said logical circuit each including control conductor means arranged in magnetic field applying relationship to at least one of said gate conductors for each of said first and second gating devices; the control conductor means for each of said individual inputs being arranged in magnetic field applying relationship to a different combination of said gate conductors of said first and second gating devices so that said first gating device is driven resistive when the inputs applied satisfy a first logical function and said second gating device is driven resistive when said inputs applied satisfy a second logical function; whereby said current from said source is directed to said second output terminal for said logical circuit when the applied inputs satisfy said second logical function but not said first logical function and is directed to said first output terminal and is prevented from reaching said second output terminal when said inputs applied satisfy said first logical function regardless of whether or not they satisfy said second logical function.

21. In a superconductor logical circuit; a plurality of superconductor gating devices maintained at a superconductive temperature and connected in a series circuit between first and second terminals; a current source connected to said first terminal; a plurality of individual input means for said logical circuit each including control conductor means arranged in magnetic field applying relationship to at least one of said gating devices; at least one of said inputs including control conductor means arranged in magnetic field applying relationship to a plurality of said gating devices; said control conductors being so arranged that each of said gating devices is driven resistive when the inputs applied satisfy a particular logical function corresponding to that gating device; a plurality of output current paths each connecting one of a plurality of current output terminals for said logical circuit to a corresponding one of a plurality of junctions in said series circuit between said terminals and said gating devices connected therein; whereby, when inputs which satisfy a particular one of said logical functions are applied to said logical circuit, the current from said source is directed out of said series circuit at one of said junctions by the one of said gating devices in said series circuit corresponding to the satisfied logical function to the proper one of said output terminals for said circuit and is prevented from reaching the succeeding ones of said gating devices in said series circuit.

22. In a superconductor logical circuit; a plurality of superconductor gating devices maintained at a superconductive temperature and connected in a series circuit between first and second terminals; a current source connected to said first terminal; a plurality of individual input means for said logical circuit each including control conductor means arranged in magnetic field applying relationship to at least one of said gating devices; at least one of said inputs including control conductor means arranged in magnetic field applying relationship to a plurality of said gating devices; said control conductors being so arranged that each of said gating devices is driven resistive when the inputs applied satisfy a particular logical function corresponding to that gating device; a plurality of output current paths each connecting one of a plurality of current output terminals for said logical circuit to a corresponding one of a plurality of junctions in said series circuit between said terminals and said gating devices connected therein; whereby, when the current from said source is flowing in said series circuit from the first to the second terminal thereof and inputs are applied which satisfy more than one of said logical functions, the one of the gating devices connected in said series circuit nearest said current source which corresponds to one of the logical functions satisfied by the inputs directs the current from the source to the proper one of said output terminals and prevents it from reaching any other of the gating devices in the series circuit which correspond to a logical function satisfied by the inputs.

23. A superconductor binary full adder comprising first, second, and third superconductor gating devices connected in a series circuit between first and second terminals; said first gating device being connected between said first terminal and a first junction in said series circuit; said second gating device being connected between said first junction and a second junction in said series circuit; said third gating device being connected between said second junction and said second terminal in said series circuit; a current source connected to said first terminal; means maintaining said gating devices at a superconductive temperature; first, second, and third binary input conductors for said binary full adder each arranged in magnetic field applying relationship to each of said gating devices; said input conductors being effective when any one or more thereof are energized to drive said third gating device resistive, when any two or more thereof are energized to drive said second gating device resistive and when all three are energized to drive said first gating device resistive; and a first order output terminal for said circuit connected through superconductor circuitry to said first terminal and said second junction.

24. The binary full adder of claim 23 wherein said third gating device comprises a single strip of superconductor material to which each of said first, second, and third input conductors is arranged in magnetic field applying relationship; said second gating device includes three superconductor strips extending in parallel circuit relationship and each of said first, second, and third binary input conductors is arranged in magnetic field applying relationship to a different pair of these three strips; and said first gating device comprising three strips of superconductor material extending in parallel circuit relationship and each of said first, second, and third binary input conductors is arranged in magnetic field applying relationship to a different one of said three strips.

25. A superconductor full adder comprising first, second, and third superconductor gating devices connected in a series circuit between first and second terminals; said first gating device being connected between said first terminal and a first junction in said series circuit; said second gating device being connected between said first junction and a second junction in said series circuit; said third gating device being connected between said second junction and said second terminal in said series circuit; a first order current input connected to said first terminal; first, second, and third binary input control conductors for said binary full adder each arranged in magnetic field applying relationship to each of said gating devices; said input conductor being effective when any one or more thereof are energized to drive said third gating device resistive, when two ore more thereof are energized to drive said second gating device resistive and when all three are energized to drive said first gating device resistive; a first order output terminal for said circuit connected both to said first terminal and to said second junction; a second order current input for said binary full adder; first and second superconductor paths connected in parallel to said second order current input; a second order output terminal for said binary full adder connected to said second superconductor current path; and fourth and fifth control conductor means connected to said first terminal and first junction, respectively, in said series circuit and each arranged in magnetic field applying relationship to at least a portion of said first superconductor current path connected to said second order current input.

26. A superconductor adder circuit comprising a plurality of superconductor gating devices connected in series with a current source and each maintained at a temperature at which it is superconductive in the absence of a magnetic field; a plurality of input conductors for said circuit each arranged in magnetic field applying relationship to a plurality of said gating devices so that each of said gating devices is driven resistive for each combination of inputs requiring a particular corresponding sum output as well as for at least one combination of inputs requiring a larger sum output; and a plurality of output terminals for said adder circuit connected to different ones of a plurality of junctions to which said gating devices are connected in said series circuit.

27. A superconductor adder circuit comprising a plurality of superconductor gating devices connected in a series circuit with a current source and each maintained at a temperature at which it is superconductive in the absence of a magnetic field; a plurality of output terminals for a said adder circuit each connected by a superconductor output circuit to at least one of a plurality of junctions to which said gating devices are connected in said series circuit; each of said superconductor output circuits having connected therein a gating device maintained at a temperature at which it is superconductive in the absence of a magnetic field; a plurality of control conductors each connected in said series circuit and each arranged in magnetic field applying relationship to a corresponding one of said gating devices in one of said output circuits; whereby when current is directed through said series circuit each of said gating devices in said superconductor output circuits is maintained resistive; a plurality of input conductors for said adder circuit each arranged in magnetic field applying relationship to a plurality of said gating devices in said series circuit whereby each of said gating devices in said series circuit is driven resistive when the inputs applied require a particular corresponding sum output; said gating devices being connected in said series circuit so that the one thereof corresponding to the highest value sum output which may be required is connected nearest the current source and each of said gating devices is separated from said current source by all of said gating devices corresponding to higher sum outputs than that gating device.

References Cited in the file of this patent

Publication I—Cryogenic Devices in Logical Circuitry and Storage, Electrical Manufacturing, February 1958, pgs. 78–83.